United States Patent [19]

Bhattacharyya et al.

[11] Patent Number: 4,713,431

[45] Date of Patent: Dec. 15, 1987

[54] HIGH MOLECULAR WEIGHT DADMAC POLYMERS BY INVERSE EMULSION TECHNOLOGY

[75] Inventors: Bhupati R. Bhattacharyya, Downers Grove, Ill.; Philip D. Dalsin, Carlsbad, Calif.

[73] Assignee: Nalco Chemical Company, Naperville, Ill.

[21] Appl. No.: 930,967

[22] Filed: Nov. 12, 1986

Related U.S. Application Data

[63] Continuation of Ser. No. 789,606, Oct. 21, 1985, abandoned.

[51] Int. Cl.[4] ............................................... C08F 2/32
[52] U.S. Cl. .................................... 526/207; 526/295
[58] Field of Search ................... 526/303.1, 295, 310, 526/206, 207

[56] References Cited

U.S. PATENT DOCUMENTS 3,544,318 12/1970 Boothe ............................... 526/310
4,176,107 11/1979 Buckman ............................ 526/310
4,225,445 9/1980 Dixon ................................. 524/815

Primary Examiner—Christopher Henderson
Attorney, Agent, or Firm—John G. Premo; Anthony L. Cupoli; Donald G. Epple

[57] ABSTRACT

High molecular weight DADMAC polymers are produced by polymerizing an inverse latex of DADMAC with 0.5 to 3 weight percent acrylamide. The polymerization uses a low HLB emulsifier and a free radical initiator.

2 Claims, No Drawings

HIGH MOLECULAR WEIGHT DADMAC POLYMERS BY INVERSE EMULSION TECHNOLOGY

This is a continuation of co-pending application Ser. No. 789,606 filed on 10-21-85, now abandoned.

INTRODUCTION

It is known that DADMAC* polymerizes to form low molecular weight polymers, e.g. those having a molecular weight usually below about 500,000. This is true even when the DADMAC is produced using the inverse emulsion techniques described in U.S. Pat. No. 3,920,599, the disclosure of which is incorporated herein by reference.

* See Glossary

PRIOR ART

It is possible to produce relatively high molecular weight polyDADMAC using the procedure of Japanese Patent 56-18611. The procedure of the Japanese process involved using a polymerization time of one week at low temperatures. This process is obviously not commercially feasible.

THE INVENTION

It has now been found that DADMAC may be polymerized to produce high molecular weight polymers in a stable latex form when it is polymerized using inverse polymerization techniques by conducting said polymerization using as a comonomer 0.5–10 and preferably 1.0–5% by weight acrylamide based on the weight of monomers present in the system.

Inverse emulsion polymerizations of water-soluble monomers to produce water-soluble polymers are well known. See specifically U.S. Pat. No. 3,920,599 and also the basic patent in this field, U.S. Pat. No. 3,284,393.

When DADMAC is polymerized using an inverse emulsion polymerization technique and there is present in the system acrylamide monomer in the amounts specific above, polymers having high molecular weights are produced. These polymers, when dissolved, have Intrinsic Viscosities above 2. Usually they are within the range of 2.0–6.5. When the inverse emulsion polymerizations are conducted, they are done so by forming a water-in-oil emulsion of the DADMAC and the acrylamide in the amounts specified above and polymerizing this inverse emulsion in the presence of a low HLB emulsifier and a free radical initiator.

The conditions of polymerization, the concentrations of DADMAC in the emulsion, and the like are described in the patents previously cited and incorporated herein by reference.

EVALUATION OF THE INVENTION

Set forth below as Examples 1–9 are typical illustrations showing how the polymers of the invention are prepared:

EXAMPLE 1

| 45% solid | |
|---|---|
| Wt. % AcAm* | 0.44 |
| Wt. % DADMAC* | 99.56 |
| Monomer Phase: | |
| 47.5% AcAm | 4.19 |
| 62% DADMAC | 722.60 |
| DI-H$_2$O | 2.01 |
| Versene* | 0.20 |
| pH 5.13 adjusted | |
| Oil Phase: | |
| LOPS* | 250.00 |
| Span 80* | 7.00 |
| Tween 61* | 7.00 |
| Alkaterge T* | 6.00 |
| Inhibitor: | |
| Vazo 64* | 1.00 |
| Temp. profile: | |
| 60° C. - 2 hrs. | |
| 75° C. - 6 hrs. | |
| RSV = 1.84 | |
| IV = 1.7 | |
| Wt. % DADMAC incorporated = 90.5 | |

*See Glossary.

EXAMPLE 2

| 45% solid | |
|---|---|
| Wt. % AcAm | 1.11 |
| Wt. % DADMAC | 98.89 |
| Monomer Phase: | |
| 47.5% AcAm | 10.56 |
| 62% DADMAC | 717.72 |
| DI-H$_2$O | 0.52 |
| Versene | 0.20 |
| pH 5.04 adjusted | |
| Oil Phase: | |
| LOPS | 250.00 |
| Span 80 | 7.00 |
| Tween 61 | 7.00 |
| Alkaterge T | 6.00 |
| Inhibitor: | |
| Vazo 64 | 1.00 |
| Temp. profile: | |
| 60° C. - 2 hrs. | |
| 75° C. - 6 hrs. | |
| RSV = 2.4 | |
| IV = 2.3 | |
| Wt. % DADMAC incorporated = 90.7 | |

*See Glossary

EXAMPLE 3

| 45% solid | |
|---|---|
| Wt. % AcAm | 1.80 |
| Wt. % DADMAC | 98.20 |
| Monomer Phase: | |
| 47.5% AcAm | 17.04 |
| 62% DADMAC | 712.75 |
| Versene | 0.20 |
| pH 5.43 adjusted | |
| Oil Phase: | |
| LOPS | 250.00 |
| Span 80 | 7.00 |
| Tween 61 | 7.00 |
| Alkaterge T | 6.00 |
| Inhibitor: | |
| Vazo 64 | 1.00 |
| Temp. profile: | |
| 60° C. - 2 hrs. | |
| 75° C. - 6 hrs. | |
| RSV = 2.27 | |
| IV = 2.15 | |
| Wt. % DADMAC incorporated = 92.4 | |

EXAMPLE 4

| | | |
|---|---|---|
| Wt. % AcAm | 2.26 | |
| Wt. % DADMAC | 97.74 | |
| Mole % DADMAC | 95.00 | |
| Mole % AcAm | 5.00 | |
| Aqueous Phase: | | |
| 78.0% DADMAC | 563.88 | gram |
| 45% AcAm | 22.62 | gram |
| Water, D.I. | 132.41 | gram |
| Versene | 0.1 | gram |
| Oil Phase: | | |
| LOPS | 260.00 | gram |
| Span 80 | 7.00 | gram |
| Tween 61 | 7.00 | gram |
| Alkaterge T | 6.00 | gram |
| Inhibitor: | | |
| Vazo 64 | 1.00 | gram |
| Procedure: $N_2$ purge | | |
| Temp. profile: | | |
| 60° C. - 2 hrs. | | |
| 75° C. - 4 hrs. | | |
| RSV = 2.3 | | |

EXAMPLE 5

(4.6 Wt. % AcAm/95.4 Wt. % DADMAC 45% solids

| | | |
|---|---|---|
| Oil Phase: | | |
| LOPS | 260.00 | gram |
| Span 80 | 7.00 | gram |
| Tween 61 | 7.00 | gram |
| Alkaterge T | 6.00 | gram |
| Monomer Phase: | | |
| 75% DADMAC solution | 572.06 | gram |
| 47% AcAm | 44.59 | gram |
| Water, D.I. | 102.25 | gram |
| Versene | 0.10 | gram |
| Catalyst: | | |
| Vazo 64 | 1.00 | gram |
| Temperature: | | |
| 50° C. for 1 hour | | |
| 60° C. for 2 hours | | |
| 75° C. for 5 hours | | |
| Final Sample: | | |
| % polymer = 85.2 | | |
| % solids = 38.7 | | |
| RSV = 2.90 | | |
| IV = 2.72 | | |
| HC = 0.518 | | |

EXAMPLE 6

| | | |
|---|---|---|
| Aqueous Phase: | | |
| 78% DADMAC | 519.79 | gram |
| 45% AcAm | 99.02 | gram |
| Water, D.I. | 100.08 | gram |
| Versene | 0.10 | gram |
| pH adjusted to 5.0 | | |
| Oil Phase: | | |
| LOPS | 260.00 | gram |
| Span 80 | 7.0 | gram |
| Tween 61 | 7.0 | gram |
| Alkaterge T | 6.0 | gram |
| Initiator: | | |
| Vazo 64 | 1.00 | gram |
| Procedure: $N_2$ purge. | | |
| Temperature: | | |
| 60° C. for 2 hours | | |
| 75° C. for 5 hours | | |
| Product: 45% solid | | |
| Wt. % DADMAC = 90.10 | | |

-continued

| | |
|---|---|
| Wt. % AcAm = 9.90 | |
| Mole % DADMAC = 80.00 | |
| Mole % AcAm = 20.00 | |
| Incorporation = 100% | |
| RSV = 6.5 | |

EXAMPLE 7

(90/10 Wt. %) DADMAC/AcAm copolymer- 45% solid

| | | |
|---|---|---|
| Aqueous Phase: | | |
| 75% DADMAC monomer | 540.6 | gm. |
| 44.81 AcAm | 78.8 | gm. |
| Versene | 0.1 | gm. |
| Adjust pH to 5.0 with $H_2SO_4$ | | |
| Oil Phase: | | |
| LOPS | 260.00 | gm. |
| Span 80 | 7.00 | gm. |
| Tween 61 | 7.00 | gm. |
| Alkaterge T | 6.00 | gm. |
| Inhibitor: | | |
| Vazo 64 | 1.00 | gm. |
| Procedure: | | |
| 50° C. for 1 hr.; | | |
| 60° C. for 2 hr.; | | |
| 75° C. for 5 hrs. | | |
| IV = 4.86 | | |
| RSV = 4.95 | | |
| Wt. % DADMAC incorporated = 86.0 | | |

EXAMPLE 8

(87/13 Wt. %) DADMAC/AcAm copolymer- 45.0% solid

| | | |
|---|---|---|
| Aqueous Phase: | | |
| 75% DADMAC monomer | 523.3 | gm. |
| 44.81 AcAm | 128.4 | gm. |
| DI $H_2O$ | 67.2 | gm. |
| Versene | 0.1 | gm. |
| Sodium Formate | 0 | |
| pH - 5 | | |
| Oil Phase: | | |
| LOPS | 260.00 | gm. |
| Span 80 | 7.00 | gm. |
| Tween 61 | 7.00 | gm. |
| Alkaterge T | 6.00 | gm. |
| Inhibitor: | | |
| Vazo 64 | 1.00 | gm. |
| Procedure: | | |
| 50° C. for 1 hr.; | | |
| 60° C. for 2 hr.; | | |
| 75° C. for 5 hrs. | | |
| IV = 4.86 | | |
| RSV = 4.95 | | |
| Wt. % DADMAC incorporated = 86.0 | | |

EXAMPLE 9

13/87 Wt. % (AcAm/DADMAC) % solid = 43.8

| | | |
|---|---|---|
| Aqueous Phase: | | |
| 75% DADMAC | 509.36 | gm. |
| 46.4% AcAm | 120.65 | gm. |
| D.I. $H_2O$ | 88.69 | gm. |
| Sodium formate | 0.20 | gm. |
| Versene | .10 | gm. |
| Oil Phase: | | |
| LOPS | 260.0 | gm. |
| Span 80 | 17.0 | gm. |

13/87 Wt. % (AcAm/DADMAC)
% solid = 43.8

Tween 80*     3.0 gm.
Initiator:
Vazo 64     1.00 gm.
Procedure:
50° C. for 1 hour;
60° C. for 2 hours;
75° C. for 5 hours.
% Gel = 1.8
Product:
IV = 3.84
RSV = 4.0
HC = 0.189
Residual: AcAm = 210 ppm
Brookfield Viscosity = 60 × 25 = 1,500
Titration = 41.8 ml PVSK
% Solid = 39.3%
88.35% incorporated

*See Glossary

Reaction Conditions to Achieve High Molecular Weight and Highly Incorporated DADMAC Polymer 1. Monomer concentration in the aqueous phase should be greater than 60 Wt. %.
2. Higher temperature and longer time of reaction help to react more DADMAC. High temperature did not have adverse effect on molecular weight of polymer (generally, high temperature lowers the molecular weight).

All examples were given with Span 80/Tween 61 and Alkaterge T emulsifier. Products are also prepared with Span 80 and Tween 80 emulsifier system at 2% emulsifier.

Span 80—1.7 Wt. % (85%)
Tween 80—0.3 Wt. % (15%)

Using the above procedures, a series of DADMAC polymers with 0.5–10% by weight acrylamide were prepared. These results are presented below in Table 1.

TABLE 1

High Charge Cationic Polymers

| Example Number | Wt. % Acrylamide Monomer | Wt. % DADMAC Monomer | Wt. % DADMAC Incorporated | Wt. % Cationic Charge in Polymer | % Active Polymer | IV | RSV at 0.045 d/gm |
|---|---|---|---|---|---|---|---|
| 1 | 0.44 | 99.56 | 90.5 | 99.5 | 40.7 | 1.7 | 1.84 |
| 2 | 1.10 | 98.9 | 90.7 | 98.8 | 40.9 | 2.3 | 2.4 |
| 3 | 1.8 | 98.2 | 92.4 | 98.1 | 41.6 | 2.2 | 2.3 |
| 4 | 2.3 | 97.7 | 83.0 | 97.3 | 37.5 | 2.2 | 2.3 |
| 5 | 4.6 | 95.4 | 85.2 | 94.7 | 38.7 | 2.7 | 2.9 |
| 6 | 9.9 | 90.1 | 100.0 | 90.1 | 45.0 | 5.9 | 6.5 |
| 7 | 9.9 | 90.1 | 86.0 | 88.6 | 39.3 | 4.9 | 5.0 |
| 8 | 13.0 | 87.0 | 86.0 | 85.3 | 39.5 | 4.3 | 5.1 |

GLOSSARY

| | |
|---|---|
| DADMAC | Diallyl Dimethyl Ammonium Chloride |
| AcAm | Acrylamide |
| LOPS | Low odor paraffin solvent |
| Span 80 | Sorbitan monooleate |
| Tween 61 | Polyethylene oxide (PEO 4 moles) Sorbitan monostearate |
| Tween 80 | Polyethylene oxide (PEO 20 moles) Sorbitan monooleate |
| Alkaterge T | A substituted oxazoline |
| Versene | Water-soluble chelant. |
| Vazo 64 | Azo free radical catalyst |

We claim:

1. A method of producing a high molecular weight water-in-oil emulsion of poly diallyl dimethyl ammonium chloride which comprises preparing a water-in-oil monomer emulsion of diallyl dimethyl ammonium chloride, said emulsion being further characterized as containing between 0.5–4% by weight of acrylamide based on the weight of diallyl dimethyl ammonium chloride monomer present in said emulsion, and then polymerizing said monomer emulsion in the presence of a low HLB emulsifier and a free radical initiator whereby a high molecular weight poly diallyl dimethyl ammonium chloride polymer is produced having an Intrinsic Viscosity greater than 2.

2. The method of claim 1 where the amount of acrylamide ranges between 0.5–3% by weight based on diallyl dimethyl ammonium chloride present in said emulsion.

* * * * *